(12) United States Patent
Johnson et al.

(10) Patent No.: US 7,516,298 B2
(45) Date of Patent: Apr. 7, 2009

(54) SPARSE TABLE COMPACTION METHOD

(75) Inventors: Vernon R. Johnson, Santa Clara, CA (US); Ronald N. Hilton, Cupertino, CA (US)

(73) Assignee: Platform Solutions Incorporated, Sunnyvale, CA (US)

( * ) Notice: Subject to any disclaimer, the term of this patent is extended or adjusted under 35 U.S.C. 154(b) by 222 days.

(21) Appl. No.: 11/271,075

(22) Filed: Nov. 10, 2005

(65) Prior Publication Data

US 2006/0107023 A1    May 18, 2006

(51) Int. Cl.
*G06F 12/00* (2006.01)
(52) U.S. Cl. .................................. 711/206; 711/217
(58) Field of Classification Search ................. None
See application file for complete search history.

(56) References Cited

U.S. PATENT DOCUMENTS

| | | | | |
|---|---|---|---|---|
| 5,119,290 A | * | 6/1992 | Loo et al. | 711/210 |
| 5,784,707 A | * | 7/1998 | Khalidi et al. | 711/206 |
| 5,873,124 A | * | 2/1999 | Draves | 711/202 |
| 6,006,312 A | * | 12/1999 | Kohn et al. | 711/210 |
| 6,553,460 B1 | * | 4/2003 | Chopra et al. | 711/125 |
| 2004/0117590 A1 | * | 6/2004 | Arimilli et al. | 711/203 |

OTHER PUBLICATIONS

IBM Technical Disclosure Bulletin, vol. 32, No. 9B, Feb. 1990, pp. 14-15, Method for Finite State Table Compaction.
IBM Technical Disclosure Bulletin, vol. 32, No. 4A, Sep. 1989, pp. 217-222, Means for Updating and Searching Sparse Tables.

* cited by examiner

*Primary Examiner*—Brian R Peugh
(74) *Attorney, Agent, or Firm*—Kenyon & Kenyon

(57) ABSTRACT

A method and system of sparse table compaction is disclosed. A repeating data pattern may be detected in a large data structure, identifying the large data structure as a sparse table. The large data structure is stored in a virtual memory as a series of virtual data pages. Multiple repeating virtual data pages may be mapped to a single physical data page on a multiple-to-one basis. Unique virtual data page may be mapped to a unique physical data page on a one-to-one basis.

20 Claims, 3 Drawing Sheets

100

200

300

SPARSE TABLE COMPACTION METHOD

The present invention relates to the virtual memory of a computer system and, in particular, to a compaction method for a sparse table.

A large data structure may be stored in a memory divided into a series of data pages. Each of these data pages may be represented in both a physical memory or in a virtual memory. The large data structure is a sparse table when the same data pattern is repeated throughout most of the structure. A memory storing a sparse table wastes a great deal of storage space storing the same pattern in multiple data pages.

One previous method of compensating for a sparse table is to create an offset that causes all the repeated pages prior to the last repeated page to be skipped. Everything prior to the last repeated page is considered to be an invalid transaction. This method can lead to wasteful storage and loss of data, especially if the repeated pattern is interspersed with a non-repeated pattern.

DETAILED DESCRIPTION

A method and system of sparse table compaction is disclosed. A repeating data pattern may be detected in a large data structure, identifying the large data structure as a sparse table. The large data structure may be stored in a virtual memory as a series of virtual data pages. Multiple repeating virtual data pages may be mapped to a single physical data page on a multiple-to-one basis. Unique virtual data page may be mapped to a unique physical data page on a one-to-one basis.

Figure 1:
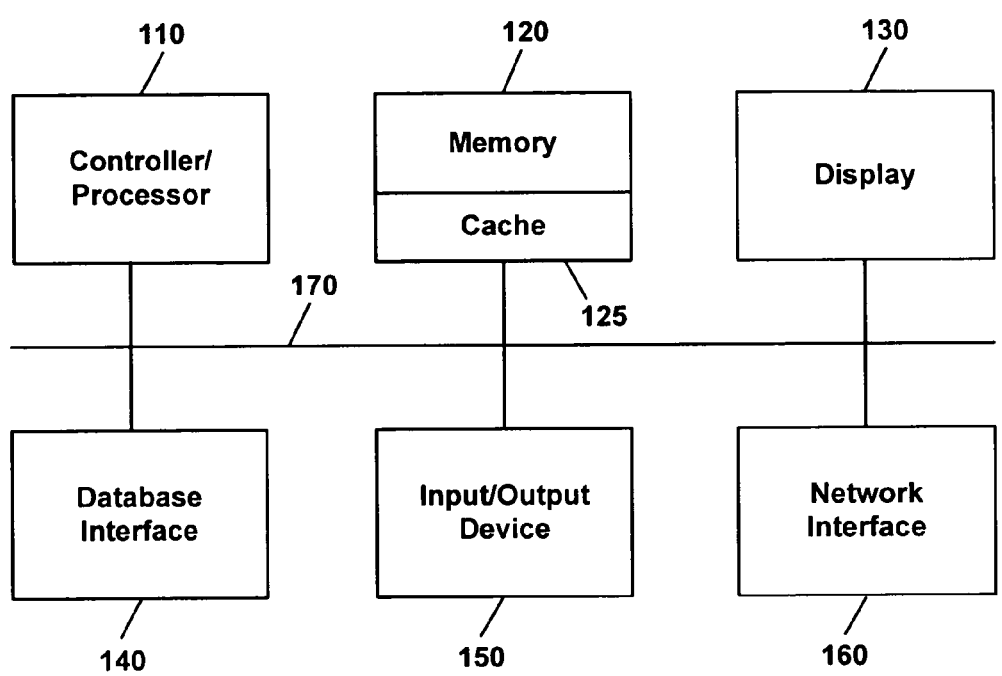
FIG. 1 is a diagram of a possible configuration of a computer system to execute the present invention.

FIG. 1 illustrates a possible configuration of a computer system 100 to execute the present invention. The computer system 100 may include a controller/processor 110, memory 120, display 130, database interface 140, input/output device interface 150, and network interface 160, connected through bus 170.

The controller/processor 110 may be any programmed processor known to one of skill in the art. However, the data processing method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the data processing method as described herein can be used to implement the data processing system functions of this invention.

The Input/Output interface 150 may be connected to one or more input devices that may include a keyboard, mouse, pen-operated touch screen or monitor, voice-recognition device, or any other device that accepts input. The Input/Output interface 150 may also be connected to one or more output devices, such as a monitor, printer, disk drive, speakers, or any other device provided to output data.

The memory 120 may include volatile and nonvolatile data storage, including one or more electrical, magnetic or optical memories such as a RAM, cache, hard drive, CD-ROM drive, tape drive or removable storage disk. The memory may have a caching system 125 for speeding access to various memory data entries.

The network interface 160 may be connected to a communication device, modem, network interface card, or any other device capable of transmitting and receiving signals over a network 130. The components of the computer system 100 may be connected via an electrical bus 170, for example, or linked wirelessly.

Client software and databases may be accessed by the controller/processor 110 from memory 120 or through the database interface 140, and may include, for example, database applications, word processing applications, the client side of a client/server application such as a billing system, as well as components that embody the data processing functionality of the present invention. The computer system 100 may implement any operating system, such as Windows or UNIX, for example. Client and server software may be written in any programming language, such as ABAP, C, C++, Java or Visual Basic, for example.

Figure 2:
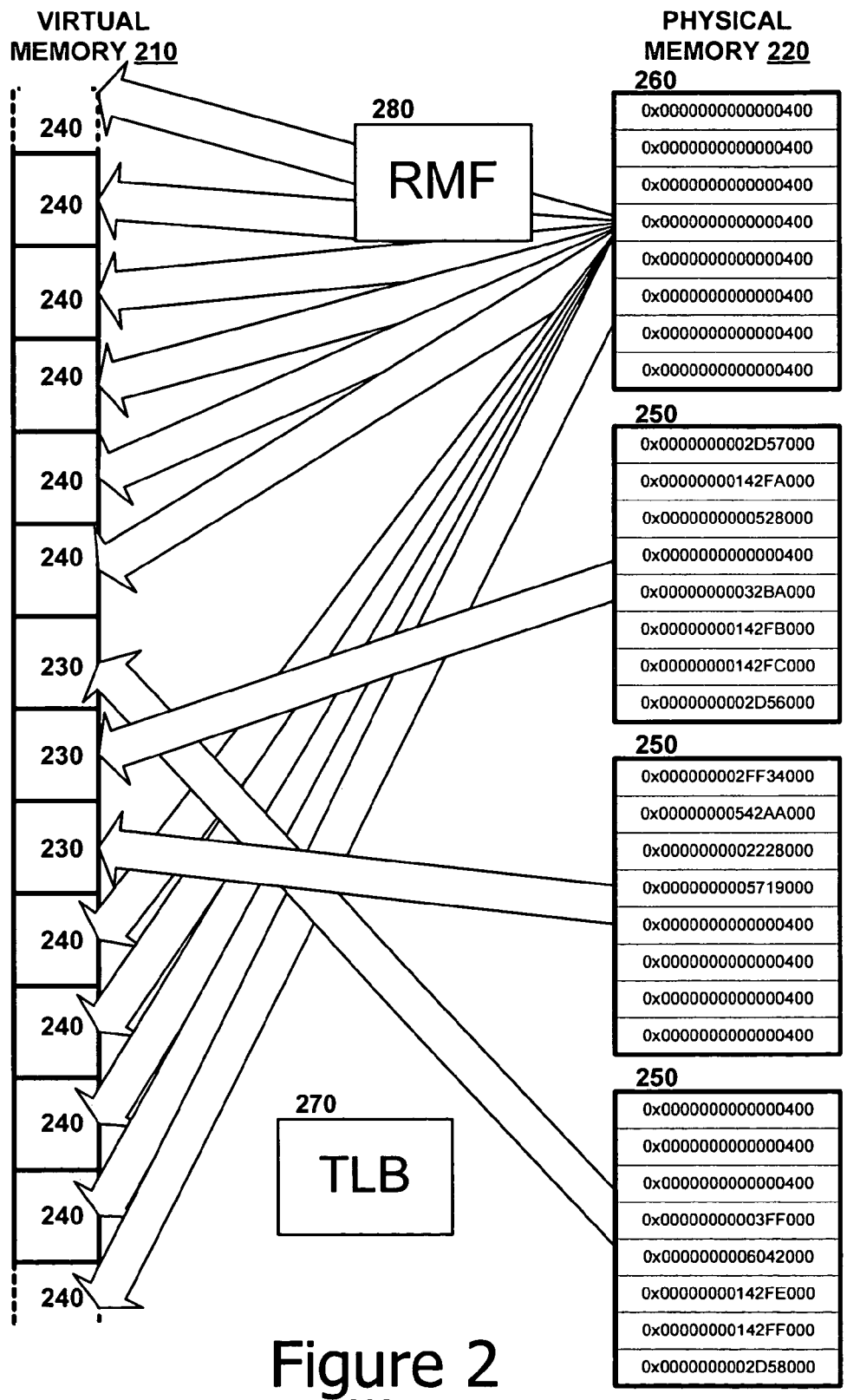
FIG. 2 is a diagram of one embodiment of a compacted sparse table.

FIG. 2 illustrates in a block diagram one embodiment of a sparse table compaction method 200. A data structure represented in a virtual memory 210 may be written to physical memory 220. The data structure may be organized into a series of virtual pages. In a sparse table, the data structure, in addition to having a number of unique pages 230, may include a number of virtual data pages 240 that are part of a repeating pattern. The page organization may be such that the repeating pattern 240 creates a number of virtual data pages that are identical. The unique virtual data pages 230 may be mapped to unique physical pages 250 on a one-to-one basis. The multiple repeating virtual data pages 240 may be mapped to a single physical page 260, mapped on a many-to-one basis. In one embodiment, a translation lookaside buffer (TLB) 270 may eliminate the overhead of mapping the virtual memory 210 to the physical memory 220 the majority of the time. As the values are written to physical memory, multiple repeating pages 240 may be virtually mapped by a real mapping facility (RMF) 280 instead of written to physical memory 220. The physical pages may include a data field to indicate the number of repeating virtual data pages 240 that the physical page represents. The virtual memory structure 210 may be recreated by multiplying the number of repeated virtual data pages 240 based upon the data field. Alternatively, if the repeating virtual data pages are represented by an offset, the number of data pages may be recreated by duplicating the number of virtual data pages to match the size of the offset.

Figure 3:
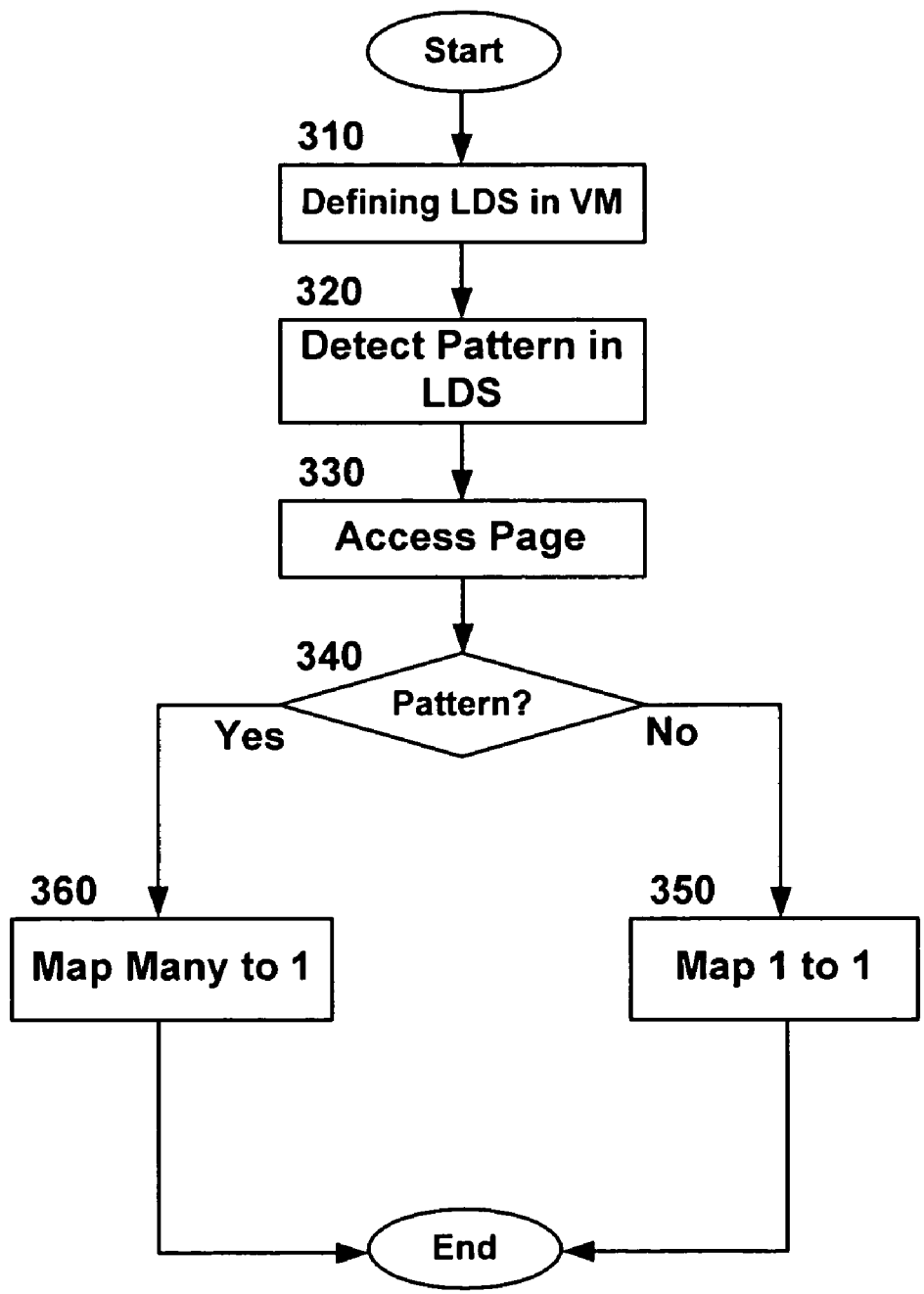
FIG. 3 is a flowchart of one embodiment of a method of compacting a sparse table.

FIG. 3 illustrates in a flowchart one embodiment of a method 300 for compacting a sparse table. A large data structure (LDS) may be initially defined in a virtual memory (VM) 210 (Block 310). The LDS need not be initially defined in the physical memory 220. A processor 110 may detect a pattern in the LDS, indicating that the LDS is a sparse table (Block 320). The processor 110 may access a virtual data page (VDP) of the LDS (Block 330). If the VDP is a unique VDP 230 (Block 340), then the unique VDP 230 may be mapped to the physical memory (PM) 220 on a one-to-one basis (Block 350). The mapping need only occur when the VDP is accessed. If the VDP is a repeating VDP 240 (Block 340), then the repeating VDP 240 may be mapped to the PM 220 on a many-to-one basis (Block 360).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. In a computer system, a method comprising:
   detecting in a data structure multiple repeating virtual data pages; and
   mapping the multiple repeating virtual data pages to a single physical data page on a multiple-to-one basis.
2. The method of claim 1, further comprising virtually mapping a page only if a page is accessed.
3. The method of claim 1, wherein virtual mapping is performed with a translation lookaside buffer.
4. The method of claim 1, further comprising virtually mapping a repeating data page with a real mapping facility.
5. The method of claim 1, further comprising initially storing the data structure in the virtual memory.
6. The method of claim 5, wherein the data structure is not initially stored in a physical memory.
7. The method of claim 1, further comprising mapping a unique virtual data page to a unique physical data page on a one-to-one basis.
8. The method of claim 1, further comprising mapping a unique virtual data page to a unique physical data page on a one-to-one basis.
9. A set of instructions residing in a storage medium, said set of instructions capable of being executed by a storage controller to implement a method for processing data, the method comprising:
   detecting in a data structure having a data pattern repeated throughout the data structure; and
   mapping multiple repeating virtual data pages to a single physical data page on a multiple-to-one basis.
10. The set of instructions of claim 9, further comprising virtually mapping a page only if a page is accessed.
11. The set of instructions of claim 9, wherein virtual mapping is performed with a translation lookaside buffer.
12. The set of instructions of claim 9, further comprising virtually mapping a repeating data page with a real mapping facility.
13. The set of instructions of claim 9, wherein the data structure is configured in virtual memory.
14. The set of instructions of claim 13, wherein the data structure is not initially stored in a physical memory.
15. A computer system comprising:
    a virtual memory to store a data structure; and
    a processor to detect in the data structure having a data pattern repeated throughout the data structure and to map multiple repeating virtual data pages to a single physical data page on a multiple-to-one basis.
16. The computer system of claim 15, further comprising virtually mapping a page only if a page is accessed.
17. The computer system of claim 15, further comprising a translation lookaside buffer to perform the virtual mapping.
18. The computer system of claim 15, further comprising a real mapping facility to virtually map a repeating data page.
19. The computer system of claim 15, wherein the data structure is initially defined in the virtual memory without storing the data structure in a physical memory.
20. The computer system of claim 15, wherein a unique virtual data page is mapped to a unique physical data page on a one-to-one basis.

* * * * *